United States Patent
Yao et al.

(10) Patent No.: US 7,305,483 B2
(45) Date of Patent: Dec. 4, 2007

(54) METHOD FOR THE REAL-TIME DISTRIBUTION OF STREAMING DATA ON A NETWORK

(75) Inventors: Hongyu Yao, San Jose, CA (US); Amol Kekre, Fremont, CA (US); Michael Bennett, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 0 days.

(21) Appl. No.: 10/132,974

(22) Filed: Apr. 25, 2002

(65) Prior Publication Data
US 2003/0204585 A1 Oct. 30, 2003

(51) Int. Cl.
*G06F 15/16* (2006.01)
(52) U.S. Cl. .................. 709/231; 709/203; 709/207
(58) Field of Classification Search ............. 709/203, 709/219, 232, 101, 224, 231, 207; 707/203, 707/207, 231
See application file for complete search history.

(56) References Cited

U.S. PATENT DOCUMENTS

| | | | |
|---|---|---|---|
| 3,568,156 A | 3/1971 | Thompson | |
| 4,384,329 A | 5/1983 | Rosenbaum | |
| 4,833,610 A | 5/1989 | Zamora | |
| 4,996,642 A | 2/1991 | Hey | |
| 5,062,143 A | 10/1991 | Schmitt | |
| 5,182,708 A | 1/1993 | Ejiri | |
| 5,241,674 A | 8/1993 | Kuorsawa | |
| 5,303,150 A | 4/1994 | Komeda | |
| 5,303,302 A | 4/1994 | Burrows | |
| 5,371,807 A | 12/1994 | Register | |
| 5,392,212 A | 2/1995 | Geist | |
| 5,404,505 A | 4/1995 | Levinson | |
| 5,418,951 A | 5/1995 | Damashek | |

(Continued)

FOREIGN PATENT DOCUMENTS

AU          A-53031/98          8/1998

(Continued)

OTHER PUBLICATIONS

U.S. Appl. No. 60/144,377, filed Jul. 16, 1999, Benjamin E. Hosken.

(Continued)

*Primary Examiner*—Saleh Najjar
*Assistant Examiner*—David Lazaro
(74) *Attorney, Agent, or Firm*—James J. DeCarlo; Greenberg Traurig LLP

(57) ABSTRACT

A method for sampling of streaming data for distribution on a network (e.g., the Internet) includes receiving the streaming data (which includes periodically updated information items) from a streaming data source. The periodically updated information items of the streaming data are subsequently sampled using a sampling process based on a total update rate of the streaming data ($U_a$) and a capacity of the network (C), thereby creating a sampled data stream. Alternatively, the periodically updated information items of the streaming data can be sampled using a sampling process that is also based on the importance ($K_{qmin}$) of each of the periodically updated information items and the update rate ($U_q$) of each of the periodically updated information items to create the sampled data stream. The sampled data stream is then distributed on the network (e.g., the Internet or a private area network).

16 Claims, 4 Drawing Sheets

U.S. PATENT DOCUMENTS

| | | | |
|---|---|---|---|
| 5,497,488 A | 3/1996 | Akizawa | |
| 5,499,046 A | 3/1996 | Schiller | |
| 5,539,635 A | 7/1996 | Larson, Jr. | |
| 5,548,507 A | 8/1996 | Martino | |
| 5,583,763 A | 12/1996 | Atcheson | |
| 5,592,511 A | 1/1997 | Schoen | |
| 5,608,622 A | 3/1997 | Church | |
| 5,616,876 A | 4/1997 | Cluts | |
| 5,661,787 A | 8/1997 | Pocock | |
| 5,675,786 A * | 10/1997 | McKee et al. | 707/103 R |
| 5,678,054 A | 10/1997 | Shibata | |
| 5,704,017 A | 12/1997 | Heckerman et al. | |
| 5,706,365 A | 1/1998 | Rangarajan | |
| 5,708,709 A | 1/1998 | Rose | |
| 5,713,016 A | 1/1998 | Hill | |
| 5,721,827 A | 2/1998 | Logan et al. | |
| 5,726,909 A | 3/1998 | Krikorian | |
| 5,740,134 A | 4/1998 | Peterson | |
| 5,749,081 A | 5/1998 | Whiteis | |
| 5,751,672 A | 5/1998 | Yankowski | |
| 5,754,938 A | 5/1998 | Hertz | |
| 5,758,257 A | 5/1998 | Herz | |
| 5,764,235 A | 6/1998 | Hunt et al. | |
| 5,774,357 A | 6/1998 | Hoffberg | |
| 5,790,423 A | 8/1998 | Lan et al. | |
| 5,790,935 A | 8/1998 | Payton | |
| 5,809,246 A | 9/1998 | Goldman et al. | |
| 5,819,160 A | 10/1998 | Foladare et al. | |
| 5,842,010 A | 11/1998 | Jain | |
| 5,862,220 A | 1/1999 | Perlman | |
| 5,862,339 A | 1/1999 | Bonnaure | |
| 5,864,868 A | 1/1999 | Contois | |
| 5,872,921 A * | 2/1999 | Zahariev et al. | 709/203 |
| 5,881,234 A | 3/1999 | Schwab | |
| 5,883,986 A | 3/1999 | Kopec | |
| 5,884,312 A | 3/1999 | Dustan | |
| 5,898,833 A | 4/1999 | Kidder | |
| 5,913,040 A | 6/1999 | Rakavy | |
| 5,913,041 A | 6/1999 | Ramanathan | |
| 5,926,207 A | 7/1999 | Vaughan | |
| 5,930,526 A | 7/1999 | Iverson | |
| 5,930,768 A | 7/1999 | Hooban | |
| 5,931,907 A | 8/1999 | Davies | |
| 5,941,951 A | 8/1999 | Day | |
| 5,945,988 A | 8/1999 | Williams | |
| 5,950,189 A | 9/1999 | Cohen | |
| 5,956,482 A | 9/1999 | Agraharam | |
| 5,960,430 A | 9/1999 | Haimowitz | |
| 5,969,283 A | 10/1999 | Looney | |
| 5,977,964 A | 11/1999 | Williams | |
| 5,983,176 A | 11/1999 | Hoffert | |
| 5,987,525 A | 11/1999 | Roberts | |
| 5,996,015 A | 11/1999 | Day | |
| 6,000,008 A | 12/1999 | Simcoe | |
| 6,005,603 A | 12/1999 | Flavin | |
| 6,009,382 A | 12/1999 | Martino | |
| 6,012,098 A | 1/2000 | Bayeh | |
| 6,020,883 A | 2/2000 | Herz | |
| 6,021,203 A | 2/2000 | Douceur | |
| 6,026,398 A | 2/2000 | Brown et al. | |
| 6,026,439 A | 2/2000 | Chowdhury | |
| 6,029,195 A | 2/2000 | Herz | |
| 6,031,795 A | 2/2000 | Wehmeyer | |
| 6,031,797 A | 2/2000 | Van Ryzin | |
| 6,035,268 A | 3/2000 | Carus | |
| 6,038,527 A | 3/2000 | Renz | |
| 6,038,591 A | 3/2000 | Wolfe | |
| 6,047,251 A | 4/2000 | Pon | |
| 6,047,268 A | 4/2000 | Bartoli | |
| 6,047,320 A | 4/2000 | Tezuka | |
| 6,047,327 A | 4/2000 | Tso | |
| 6,052,717 A | 4/2000 | Reynolds | |
| 6,061,680 A | 5/2000 | Scherf | |
| 6,064,980 A | 5/2000 | Jacobi | |
| 6,065,051 A | 5/2000 | Steele | |
| 6,065,058 A | 5/2000 | Hailpern | |
| 6,070,185 A | 5/2000 | Anupam | |
| 6,085,242 A | 7/2000 | Chandra | |
| 6,097,719 A | 8/2000 | Benash | |
| 6,102,406 A | 8/2000 | Miles | |
| 6,105,022 A | 8/2000 | Takahashi | |
| 6,131,082 A | 10/2000 | Hargrave, III | |
| 6,134,532 A | 10/2000 | Lazarus | |
| 6,138,142 A | 10/2000 | Linsk | |
| 6,154,773 A | 11/2000 | Roberts | |
| 6,161,132 A | 12/2000 | Roberts | |
| 6,161,139 A | 12/2000 | Win | |
| 6,167,369 A | 12/2000 | Schulze | |
| 6,182,142 B1 | 1/2001 | Win | |
| 6,185,560 B1 | 2/2001 | Young | |
| 6,192,340 B1 | 2/2001 | Abecassis | |
| 6,199,076 B1 | 3/2001 | Logan et al. | |
| 6,205,126 B1 | 3/2001 | Moon | |
| 6,222,980 B1 | 4/2001 | Asai | |
| 6,225,546 B1 | 5/2001 | Kraft | |
| 6,230,192 B1 | 5/2001 | Roberts | |
| 6,230,207 B1 | 5/2001 | Roberts | |
| 6,240,459 B1 | 5/2001 | Roberts | |
| 6,246,672 B1 | 6/2001 | Lumelsky | |
| 6,249,810 B1 | 6/2001 | Kiraly | |
| 6,252,988 B1 | 6/2001 | Ho | |
| 6,263,313 B1 | 7/2001 | Milsted | |
| 6,272,456 B1 | 8/2001 | de Campos | |
| 6,272,495 B1 | 8/2001 | Hetherington | |
| 6,282,548 B1 | 8/2001 | Burner | |
| 6,292,795 B1 | 9/2001 | Peters | |
| 6,298,446 B1 | 10/2001 | Schreiber | |
| 6,314,421 B1 | 11/2001 | Sharnoff | |
| 6,317,761 B1 | 11/2001 | Landsman | |
| 6,321,205 B1 | 11/2001 | Eder | |
| 6,321,221 B1 | 11/2001 | Bieganski | |
| 6,330,593 B1 | 12/2001 | Roberts | |
| 6,343,317 B1 | 1/2002 | Glorikian | |
| 6,349,339 B1 | 2/2002 | William | |
| 6,353,849 B1 | 3/2002 | Linsk | |
| 6,370,315 B1 | 4/2002 | Mizuno | |
| 6,370,513 B1 | 4/2002 | Kolawa | |
| 6,389,467 B1 | 5/2002 | Eyal | |
| 6,405,203 B1 | 6/2002 | Collart | |
| 6,430,539 B1 | 8/2002 | Lazarus | |
| 6,434,535 B1 | 8/2002 | Kupka | |
| 6,438,579 B1 | 8/2002 | Hosken | |
| 6,487,598 B1 | 11/2002 | Valencia | |
| 6,490,553 B2 | 12/2002 | Van Thong | |
| 6,505,160 B1 | 1/2003 | Levy | |
| 6,512,763 B1 | 1/2003 | DeGolia, Jr. | |
| 6,513,061 B1 | 1/2003 | Ebata | |
| 6,522,769 B1 | 2/2003 | Rhoads | |
| 6,526,411 B1 | 2/2003 | Ward | |
| 6,532,477 B1 | 3/2003 | Tang | |
| 6,535,854 B2 | 3/2003 | Buchner | |
| 6,538,996 B1 | 3/2003 | West | |
| 6,546,421 B1 | 4/2003 | Wynblatt et al. | |
| 6,557,026 B1 * | 4/2003 | Stephens, Jr. | 709/203 |
| 6,557,042 B1 | 4/2003 | He et al. | |
| 6,560,403 B1 | 5/2003 | Tanaka | |
| 6,560,704 B2 | 5/2003 | Dieterman | |
| 6,587,127 B1 | 7/2003 | Leeke | |
| 6,611,812 B2 | 8/2003 | Hurtado | |
| 6,611,813 B1 | 8/2003 | Bratton | |
| 6,614,914 B1 | 9/2003 | Rhoads | |
| 6,614,987 B1 | 9/2003 | Ismail et al. | |
| 6,615,039 B1 | 9/2003 | Eldering | |
| 6,615,208 B1 | 9/2003 | Behrens | |

| | | | |
|---|---|---|---|
| 6,655,963 B1 | 12/2003 | Horvitz | |
| 6,657,117 B2 | 12/2003 | Weare | |
| 6,658,151 B2 | 12/2003 | Lee | |
| 6,661,787 B1 | 12/2003 | O'Connell | |
| 6,677,894 B2 | 1/2004 | Sheynblat | |
| 6,725,446 B1* | 4/2004 | Hahn et al. | 717/103 |
| 6,741,980 B1* | 5/2004 | Langseth et al. | 707/2 |
| 6,757,740 B1 | 6/2004 | Parekh | |
| 6,807,632 B1 | 10/2004 | Carpentier | |
| 6,889,383 B1 | 5/2005 | Jarman | |
| 6,925,441 B1 | 8/2005 | Jones, III | |
| 6,952,523 B2 | 10/2005 | Tanaka | |
| 6,969,899 B2 | 11/2005 | Yaung et al. | |
| 7,010,537 B2 | 3/2006 | Eyal et al. | |
| 7,146,627 B1 | 12/2006 | Ismail et al. | |
| 2001/0005823 A1 | 6/2001 | Fischer | |
| 2001/0042107 A1 | 11/2001 | Palm | |
| 2001/0042109 A1 | 11/2001 | Bolas | |
| 2001/0044855 A1 | 11/2001 | Vermeire | |
| 2001/0052028 A1 | 12/2001 | Roberts | |
| 2001/0055276 A1* | 12/2001 | Rogers et al. | 370/232 |
| 2002/0002039 A1 | 1/2002 | Qureshey | |
| 2002/0004839 A1 | 1/2002 | Wine | |
| 2002/0007418 A1 | 1/2002 | Hegde | |
| 2002/0010621 A1 | 1/2002 | Bell | |
| 2002/0010714 A1 | 1/2002 | Hetherington | |
| 2002/0010789 A1 | 1/2002 | Lord | |
| 2002/0013852 A1 | 1/2002 | Janik | |
| 2002/0016839 A1 | 2/2002 | Smith | |
| 2002/0026499 A1 | 2/2002 | Cantone et al. | |
| 2002/0035561 A1 | 3/2002 | Archer | |
| 2002/0045717 A1 | 4/2002 | Grenda | |
| 2002/0049717 A1 | 4/2002 | Routennberg et al. | |
| 2002/0056004 A1* | 5/2002 | Smith et al. | 709/227 |
| 2002/0065857 A1 | 5/2002 | Michalewicz | |
| 2002/0082901 A1 | 6/2002 | Dunning | |
| 2002/0095387 A1 | 7/2002 | Sosa | |
| 2002/0099696 A1 | 7/2002 | Prince | |
| 2002/0099737 A1 | 7/2002 | Porter | |
| 2002/0111912 A1 | 8/2002 | Hunter | |
| 2002/0129123 A1* | 9/2002 | Johnson et al. | 709/219 |
| 2002/0152204 A1 | 10/2002 | Ortega | |
| 2002/0175941 A1* | 11/2002 | Hand et al. | 345/764 |
| 2003/0002608 A1 | 1/2003 | Glenn et al. | |
| 2003/0007507 A1 | 1/2003 | Rajwan | |
| 2003/0028796 A1 | 2/2003 | Roberts | |
| 2003/0046283 A1 | 3/2003 | Roberts | |
| 2003/0083871 A1* | 5/2003 | Foote et al. | 704/233 |
| 2003/0093476 A1 | 5/2003 | Syed | |
| 2003/0133453 A1 | 7/2003 | Makishima | |
| 2003/0135513 A1 | 7/2003 | Quinn | |
| 2003/0139989 A1* | 7/2003 | Churquina | 705/35 |
| 2003/0165200 A1 | 9/2003 | Pugel | |
| 2003/0182139 A1 | 9/2003 | Harris | |
| 2003/0190077 A1 | 10/2003 | Ross | |
| 2003/0206558 A1 | 11/2003 | Parkkinen | |
| 2004/0090462 A1 | 5/2004 | Graham | |
| 2004/0103372 A1 | 5/2004 | Graham | |
| 2005/0149759 A1 | 7/2005 | Vishwanath | |
| 2005/0216942 A1 | 9/2005 | Barton | |
| 2006/0149813 A1 | 7/2006 | Janik | |

FOREIGN PATENT DOCUMENTS

| | | |
|---|---|---|
| AU | 199954818 B2 | 3/2000 |
| EP | 0 173 639 A2 | 3/1986 |
| EP | 0 643 359 A2 | 3/1995 |
| EP | 0 751 471 A | 1/1997 |
| EP | 0860 785 A | 8/1998 |
| EP | 0 847 156 A2 | 10/1998 |
| EP | 0 955 592 A2 | 11/1999 |
| EP | 0 955 592 A3 | 11/1999 |
| EP | 1 050 833 A2 | 8/2000 |
| EP | 1 050 830 A2 | 11/2000 |
| EP | 1 236 354 A0 | 5/2001 |
| EP | 1 010 098 B1 | 6/2003 |
| EP | 1 324 567 A2 | 7/2003 |
| EP | 1 324 567 A3 | 7/2003 |
| GB | 2 306 869 | 7/1997 |
| JP | 2001202368 | 7/2001 |
| JP | 2001521642 T | 11/2001 |
| WO | 97/07467 | 2/1997 |
| WO | 98/25269 A1 | 6/1998 |
| WO | WO 98/33135 A | 7/1998 |
| WO | 98/47080 A2 | 10/1998 |
| WO | 99/27681 | 6/1999 |
| WO | 99/43111 | 8/1999 |
| WO | WO 00/04474 A | 1/2000 |
| WO | 00/31964 | 6/2000 |
| WO | 00/46681 | 8/2000 |
| WO | 01/35667 A1 | 5/2001 |
| WO | WO 200133379 A1 * | 5/2001 |
| WO | WO 200154323 A2 * | 7/2001 |
| WO | 01/73639 A1 | 10/2001 |
| WO | WO 200242862 A2 * | 5/2002 |
| WO | 03/012695 A2 | 2/2003 |

OTHER PUBLICATIONS

U.S. Appl. No. 60/165,726, filed Nov. 15, 1999, Sean Michael Ward.
U.S. Appl. No. 60/165,727, filed Nov. 15, 1999, Sean Michael Ward.
U.S. Appl. No. 60/166,039, filed Nov. 17, 1999, Sean Michael Ward.
"Fast Algorithms for Projected Clustering;" Charu C. Aggarwal, Cecilia Procopiuc, Joel L. Wolf, Philips S. Yu, and Jong Soo Park. Proceedings of the ACM SIGMOD International Conference on Management of Data, 1999.
"Mel-Frequency Cepstral Analysis," [online] [retrieved on Feb. 2, 2001] Retrieved from the internet <URL:http://ccrma-www.standford.edu/~unjung/mylec/mfcc.html>, pp. 1-3.
Agosti, M., Gradenigo, G. Marchetti, P.G., "A Hypertext Enviroment for Interacting with Large Textual Databases," pp. 469-477.
Alan Griffiths, H. Claire Luckhurst & Peter Willett, "Using Interdocument Similarity Information in Document Retrieval Systems," pp. 365-373, © 1986 by John Wiley & Sons, Inc.
Belkin, N.J. Oddy, R.N., Brooks, H.M., "The Journal of Documentation," vol. 38, No. 2, Jun. 1982, pp. 299-304.
Brian P. McCune, Richard M. Tong, Jeffrey S. Dean & Daniel G. Shapiro, "RUBRIC: A System for Rule-Based Information Retrieval," pp. 440-445.
R. Brody, PH.D., "The Conditions and Consequences of Profiling in Commercial and Governmental Settings," Technology and Society, 1998. ISTAS 98. Wiring The World: The Impact of Information Technology on Society, Proccedings of the 1998 International Symposium on South Bend, IN, USA Jun. 12-13, 1998, NY, NY, USA, IEEE, US, Jun. 12, 1998 (Jun. 12, 1998), pp. 148-154, XP010291443, ISBN: 0-7803-4327-1 *the whole document*.
C.J. van Rijisbergen B.Sc., Ph.D., M.B.C.S, "Information Retrieval," Department of Computing Science - University of Glasgow [online], 1979 [retrieved on Aug. 8, 2001] Retrieved from <URL:http://www.dcs.gla.ac.uk/keith/preface.html> (213 pages).
Chapter 3 - "Key Concepts," pp. 85-92 Found in: Readings in Information Retrieval, Edited by Karen Sparck Jones & Peter Willett, Morgan Kaufmann Publishers, Inc., San Francisco, CA © 1997.
MusicMatch Literature downloaded from web.archive.org - 7 pages total.
RealNetworks Literature downloaded from web.archive.org - 16 pages total.
Cyril Cleverdon, "The Crainfield Tests on Index Language Devices," presented Apr. 27, 1967, pp. 47-59, Found in: *Readings in Information Retrieval, Edited by Karen Sparck Jones & Peter Willett, Morgan Kaufman Publishers, Inc., San Francisco, CA ©* 1997.
Cyril W. Cleverdon & J. Mills, "The Testing of Index Language Devices,"presented Feb. 5, 1963, Chapter 3 - Key Concepts, pp. 98-110, Found in: *Readings in Information Retrieval, Edited by*

Karen Sparck Jones & Peter Willett, Morgan Kaufmann Publishers, Inc., San Francisco, CA © 1997.

Carl de Marcken, "The Unsupervised Acquisition of a Lexicon from Continuous Speech," Massachusetts Institute of Technology Artificial Intelligence Laboratory: Center for Biological and Computational Learning, Department of Brain and Cognitive Sciences, A.I. Memo No. 1558 and C.B.C.L. Memo No. 129, Nov. 2001, pp. 1-27.

E. Michael Keen, "Presenting Results of Experimental Retrieval Comparisons," Department of Information & Library Studies, University College of Wales, Aberystwyth, Sy23 3AS U.K., pp. 217-222.

G. Salton & M.E. Lesk, "Computer Evaluation of Indexing and Text Processing," pp. 60-84, Found in: Readings in Information Retrieval, Edited by Karen Sparck Jones & Peter Willett, Morgam Kaufmann Publishers, Inc., San Francisco, CA © 1997.

G. Salton & M.J. McGill, "The SMART and SIRE Experimental Retrieval Systems," pp. 381-399.

G. Salton, A. Wong & C.S. Yang, "A Vector Space Model for Automatic Indexing," Cornell University, pp. 273-280.

Gerard Salton & Christopher Buckley, "Term-Weighting Approaches in Automatic Text Retrieval," (received Nov. 19, 1987; accepted in final form Jan. 26, 1988), Department of Computer Science, Cornell University, Ithaca, NY.

Gerard Salton & Michael J. McGill, "Introduction to Modern Information Retrieval," Computer Science Series, pp. 1-435, © 1983 by McGraw-Hill, Inc., McGraw-Hill Book Company, USA.

Goldberg, Gribble, Wagner, Brewer "The Ninja Jukebox" Oct. 14, 1999.

Hayes, Connor, et al., "Smart Radio - A Proposal," Technical Report TCD-CS-1999-24, Online! Apr. 1999, pp. 1-14, XP002279579, Trinity College Dublin, Ireland, Retrieved from the Internet: <URL:http://www.cs.tcd.ie/publications/tech-reports/reports.99/TCD-CS-1999-24.pdf>, retrieved on May 7, 2004.

Hoffman, Thomas, et al., "Latent Class Models For Collaborative Filtering," Proceedings Of The Sixteenth International Joint Conference On Artificial Intelligence, IJCAI 99, Stockholm, Sweden, Jul. 31-Aug. 6, 1999, Online! pp. 688-693, XPOO2279578, Retrieved from the Internet <URL:http:/Avww.cs.brown.edu/(th/papers/HofmannPuzicha-IJCA199).pdf>, retrieved on May 7, 2004.

Hull, David A. and Grefenstette, Gregory, "Querying Across Languages: A Dictionary-Based Approach to Multilingual Information Retrieval," pp. 484-492.

Internet Papers: Freetantrum: Songprint 1.2, and computer code; www.freetantrum.org; Dec. 11, 2000; 46 pages.

Jean Tague-Sutcliffe, "The Pragmatics of Information Retrieval Experimentation Revisited," School of Library & Information Science, University of Western Ontario, Canada pp. 205-216.

Jones, Karen Sparke, Jones, G.J.F., Foote, J.T. and Young, S.J., "Experiments in Spoken Document Retrieval," pp. 493-502.

Jones, Karen Sparck and Willett, Peter, "Readings In Information Retrieval," Morgan Kaufmann Publishers, Inc., 1997, pp. 25-110, 205-246, 257-412, 440-445, 469-502, 527-533.

Karen Sparck Jones, "Search Term Relevance Weighting Given Little Relevance Information," pp. 329-338, (originally located in Journal of Documentation, vol. 35, No. 1; Mar. 1979, pp. 30-48).

Lancaster, F.W., "MEDLARS: Report on the Evaluation of its Operating Efficiency," pp. 223-246.

Lauren B. Doyle, "Indexing and Abstracting by Association - Part 1," pp. 25-38, Santa Monica, CA, Found in: *Readings in Information Retrieval, Edited by Karen Sparck Jones and Peter Willett, Morgan Kaufmann Publishers, Inc., San Francisco, CA* © 1997.

Liu, Zhu, Wang, Yao and Chen, Tsuhan, "Audio Feature Extraction and Analysis for Scene Segmentation and Classification," Journal of VLSI Signal Processing 20.61-79 (1998).

Loeb, Shoshana, "Architecting Personlized Delivery Of Multimedia Information," Communications Of The ACM, vol. 25, No. 12, Dec. 1992, pp. 39-50, XP002102709.

M.F. Porter, "An Algorithm For Suffix Stripping," Computer Laboratory, Corn Exchange Street Cambridge, 313-316.

M.E. Maron & J.L. Kuhns, "On Relevance, Probabilistic Indexing and Information Retrieval," pp. 39-46, Found in: *Readings in Information Retrieval, Edited by Karen Sparck Jones and Peter Willett, Morgan Kaufmann Publishers, Inc., San Francisco, CA* © 1997.

Nichols, David M. et al., Recommendation And Usage In The Digital Library, Technical Report Ref. CSEG/2/1997, Online! 1997, pp. 1-15, XP002279577, Retrieved from the Internet <URL:ftp://ftp.comp.lancs.ac.uk/pub/reports/1997/CSEG.2.97.pdf>, retrieved on May 7, 2007.

Rau, Lisa F., "Conceptual Information Extraction and Retrieval from Natural Language Input,"Artificial Intelligence Program GE Research and Development Center, Schenectady, NY 12301, pp. 527-533.

S.E. Robertson, "The Probability Ranking Principle In 1R," School of Library, Archive, Information Studies, University College of London, pp. 281-286.

S.E. Robertson and S. Walker, "Some Simple Effective Approximations to the 2 - Poisson Model for Probabilistic Weighted Retrieval,"Centre for Interactive Systems Research, Department of Information Science, City University, Northampton Square, London, ECIV OHB, U.K., pp. 345-354.

Salton, Gerard, Allan, James, Buckley, Singhal, Amit, "Automatic Analysis, Theme Generation, and Summarization of Machine-Readable Texts," pp. 478-483.

Schafer, J. Ben, et al., "Recommender Systems In E-Commerce,"Proceedings ACM Conference On Electronic Commerce, 1999, pp. 158-166, XP002199598.

Shah, Tej, "Improving Electronic Commerce Through Gather Customer Data,"TCC402 [online] Apr. 23, 1998 (Apr. 23, 1998) XP002379874, University of Virginia, USA, Retrieved from the Internet: <URL:http://www.lib.virginia.edu> [Retrieved on May 8, 2006] *the whole document*.

Stubblefield, Adam and Wallach, Dan S., "A Security Analysis of My.MP3.com and the Beam it Protocol," Department of Computer Science, Rice University.

Tomek Strzalkowski, "Robust Text Processing in Automated Information Retrieval,"Courant Institute of Mathematical Sciences, pp. 317-322.

W.B. Croft and D.J. Harper, "Using Probabilistic Models of Document Retrieval Without Relevance Information," Department of Computer & Information Science, University of Massachusetts, pp. 339-344.

W.J. Hutchins, "The Concept of 'Aboutness' in Subject Indexing," presented Apr. 18, 1977, Chapter 3 - Key Concepts, pp. 93-97, Found in: *Readings in Information Retrieval, Edited by Karen Sparck Jones & Peter Willett, Morgan Kaufmann Publishers, Inc., San Francisco, CA*© 1997.

Witten, Ian H. And Frank, Eibe, "Data Mining, Practical Machine Learning Tools and Techniques with JAVA Implementations," Academic Press, pp. 57-76.

Wold, Erling, Blum, Thom, Keislar, Douglas and Wheaton, James, "Content-Based Classification, Search, and Retrieval of Audio,"IEEE MultiMedia, Fall 1996.

Written Opinion of the Patent Cooperation Treaty for International Patent Application No.: PCT/US02/03504.

Bill Konig, The College Music Journal names TuneTo.com CMJ Website of the Week, "http://web.archive.org/web/20000412122646/www.tuneto.com/company/news/cmj120899.html", Apr. 12, 2000.

Business Wire, Former WebRadio.com Executive to Lead TuneTo.com's Strategic Partnership Development with the Music Industry, "http://findarticles.com/p/articles/mi_m0EIN/is_199_Oct_19/ai_56527957", Oct. 19, 1999.

Business Wire, "SpinRecords.com Announces Launch of Internet Music Made Easy", "http:/findarticles.com/p/articles/mi_m0EIN/is_2000_april_6/ai_61343898", Apr. 6, 2000.

Business Wire, top Execs From Microsoft & RealNetworks to Keynote Kagan Streaming Media Conference Oct. 6-7 in New York, "http://findarticles.com/p/articles/mi_m0EIN/is_1999_Oct_4/ai_55968610", Oct. 4, 1999.

Shands, Mark, "An Exclusive Interview with Michael Weiss", TuneTo.com, "http://web.archive.org/web/20000414081433/www/hitmakers.com/archivedfeats/weiss.html", Apr. 14, 2000.

Alvear, Jose, "Q&A with Tim Bratton, President of TuneTo.com", http://web.archive.org/web/20000417161149/www.tuneto.com/company/news/smn112399.html, Nov. 23, 1999.

Mark Smotroff, "TuneTo.com Seals $2.6 Million Series A Funding", http://web.archive.org/web/20000606181901/www.tuneto.com/company/news/pr011800.html, Jan. 18, 2000.

Dennis, Michael, "CNN story on downloadable music and Internet radio includes Tim Bratton, President of TuneTo.com", "http://web.archive.org/web/20000229210114/www.tuneto.com/company/news/cnn120299.html"Dec. 2, 1999.

Business Wire, Web Radio.com Joins Arbitron InfoStream Webcast Ratings Alliance: Arbitron to Provide Third-Party Measurement to New Web-Based Radio Broadcasting Service, May 6, 1999.

Philadelphia Inquirer, Deborah Kong, Knight Ridder News Service, "The Internet Can Turn Music Lovers Into DJS", Nov. 4, 1999.

Business Wire, "Web Radio.com Strengthens Internet Radio Destination With Content, Community, Commerce and Functionality" Aug. 31, 1999.

Supplementary European Search Report (PCT/US014/21829) Mar. 2007.

* cited by examiner

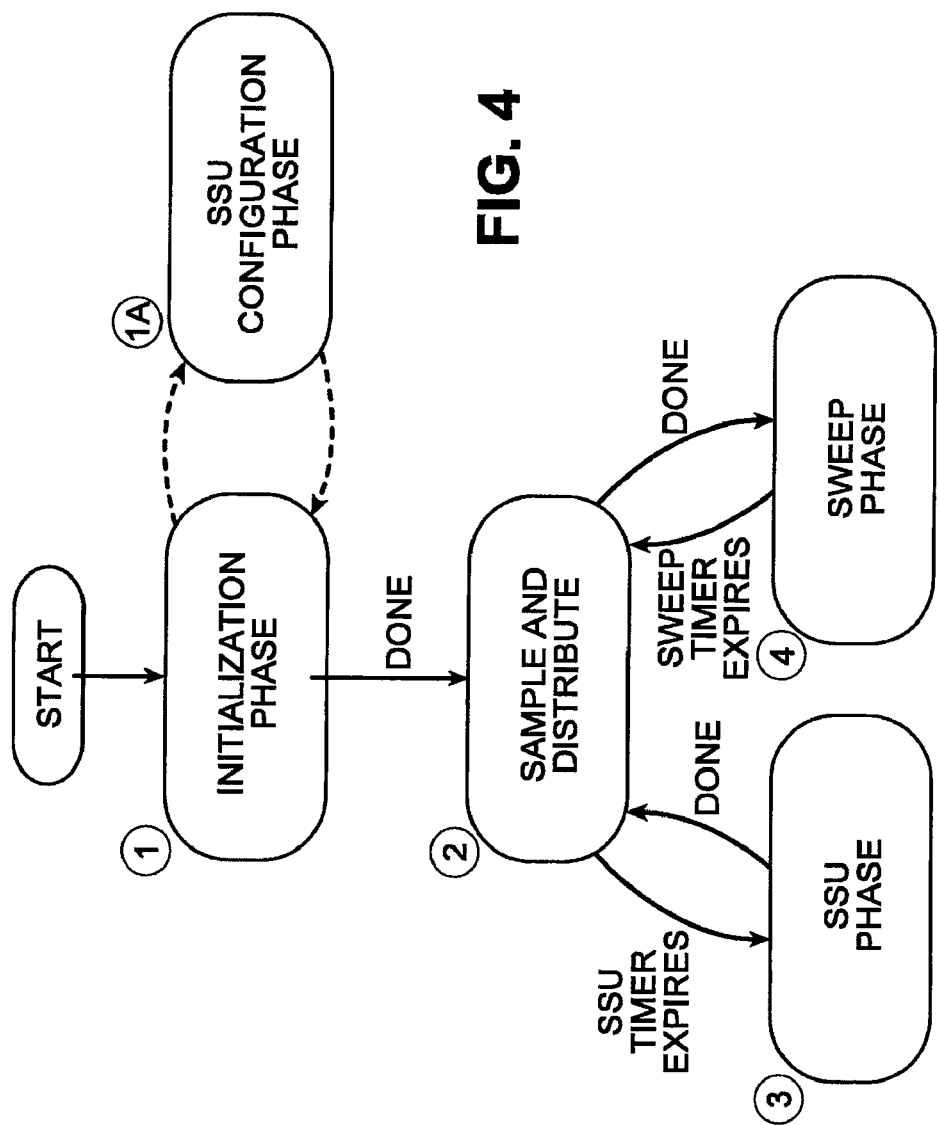

METHOD FOR THE REAL-TIME DISTRIBUTION OF STREAMING DATA ON A NETWORK

CROSS-REFERENCE TO RELATED APPLICATIONS

PCT/US03/13190 filed Apr. 25, 2003 is a continuation of 10/132,974.

BACKGROUND OF THE INVENTION

1. Field of the Invention

The present invention relates, in general, to methods for real-time distribution of changing data and, in particular, to methods for sampling streaming data for real-time distribution on a network.

2. Description of the Related Art

Many data sources provide their subscribers with large volumes of time-sensitive content using high speed streaming data in one or more media. Such streaming data might include stock quotes, other financial quotes, news bulletins, real-time weather reports or other information items. Some streaming data might also include special purpose information items, such as real-time updates to locations of objects in a position tracking system. In the general case, a data source provides one or more types of streaming media content representing information provided by that data source, where the streaming media content might represent, at least in part, a stream of updates about that information. The media can be streaming media as is narrowly defined in some contexts to be a continuous flow without a set ending point, but as used herein simply refers to data that is supplied as a flow, not necessarily continuous, that does not necessarily have a defined end and cannot be entirely obtained ahead of time. Thus, updates to one datum that is updated only once very few hours might still be treated as a stream of data.

The distribution network used to transmit the information from the data source to the users of the information often has a limited capacity (e.g., bandwidth-limited channels) that might prevent every user from getting every bit of the data provided from the data source. For example, quote data just from transactions of one stock exchange might comprise thousands of quotes, changing many times per minute, resulting in a multi-megabyte per second stream. Often, many portions of the distribution network cannot provide the bandwidth to pass that stream for real-time updates to the information. For example, if the network spans a continent, connects continents (such as North America and Asia), connects countries (such as the United States and India) or links within a poorly developed geographic region, bandwidth in some portions of the network might be extremely limited or too costly to fully exploit. Attempts to directly distribute streaming data on a wide area network can overwhelm the wide area network, resulting in a degradation of the quality (e.g., the representative nature and relevance) and timeliness of the distribution. For example, if quote data, updated once per minute, were delayed by ten minutes due to network congestion, the usefulness of the data stream would be seriously degraded.

Another problem with typical bandwidth-limited networks is that their capacity changes over time, resulting in a dynamic environment that needs to be considered. Such a dynamic environment further complicates efforts to distribute streaming data on a network.

Still needed in the field, therefore, is a method for distributing streaming data on a network that does not overwhelm networks of limited capacity, yet provides a timely and high quality distribution of periodically updated information items, in relatively static environments and dynamic environments.

SUMMARY OF THE INVENTION

The present invention provides a method for the sampling of streaming data for real-time distribution on a network that does not overwhelm the network, yet distributes a high quality sampled data stream that is derived from the streaming data in a timely manner. The method also provides for the timely and high quality distribution of a sampled data stream in a dynamic environment.

An embodiment of a method for sampling streaming data, including periodically updated information items for distribution on a network according to the present invention includes first receiving the streaming data from a streaming data source. The information items might include stock quotes, other quotes, new items, weather information, positional information, and/or other changing information items. The periodically updated information items of the streaming data are subsequently sampled at a rate that is based on the update rate of the streaming data and a capacity of the network to create a sampled data stream. The sampling rate and algorithm for determining sampling might vary from stream to stream and might be based on the relative importance of each of the periodically updated information items and the update rate of each of the periodically updated information items. The sampled data stream is then distributed on the network. The network can be a private network, a virtual private network, the Internet, an extranet, intranet, a wide area network (WAN) or the like.

One advantage of embodiments of the present invention is that the information can be distributed in a timely manner and be of high quality (i.e., well representative of the streaming data and of high relevance), since the received streaming data is sampled based on characteristics of the environment in which the streaming is occurring and, optionally, on factors representing the importance of each of the periodically updated information items and the like.

Methods according to the present invention, therefore, enable the distribution of streaming data on rate-limited networks. The parameters used for the processes of sampling can be dynamically determined, thus adjusting sampling rates to accommodate a dynamic environment. The environment in which the streaming and sampling is occurring might change due to changing network loads, changing computational resource availability, or the like.

A better understanding of the features and advantages of the present invention will be obtained by reference to the following detailed description that sets forth illustrative embodiments and the accompanying drawings.

BRIEF DESCRIPTION OF THE DRAWINGS

FIG. 4 is a flow diagram illustrating various phases of a sampling and distribution process.

DETAILED DESCRIPTION OF THE INVENTION

Figure 1:
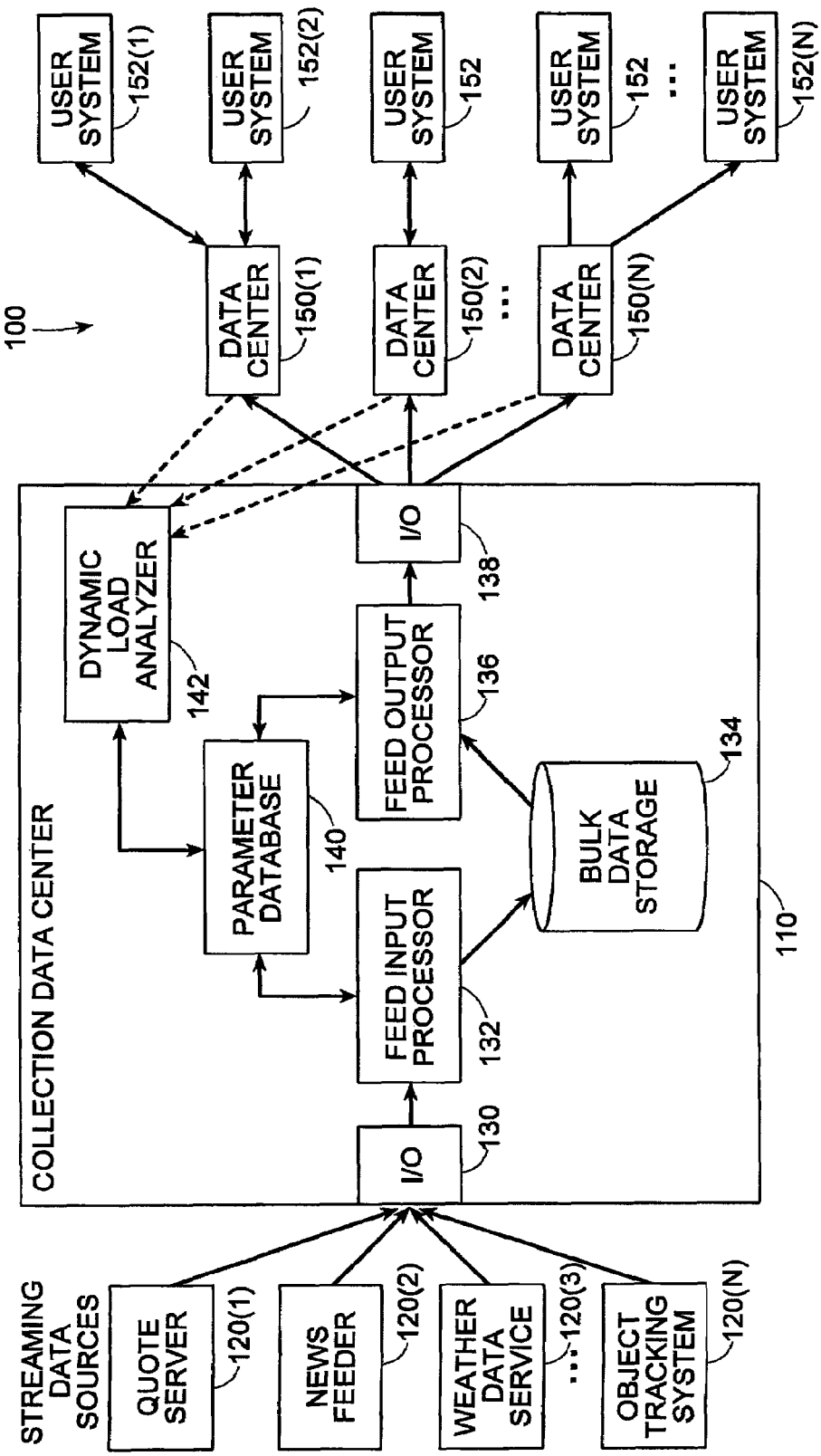
FIG. 1 is a block diagram of a network system wherein embodiments of the present invention might be used.

FIG. 1 is a block diagram of a networking system 100 wherein embodiments of the present invention might be used. As shown there, a collection data center 110 receives streams of data from various streaming data sources 120. Collection data center 110 includes input/output control (I/O) 130 to receive the data streams and provide them to a feed input processor 132. Feed input processor 132 is coupled to a data storage 134 for storing the data, which is read by feed output processor 136 and sent to I/O 138 to be transmitted to various data centers 150 according to parameters stored in a parameter database 140. Data storage 134 might be a magnetic storage device, but in a typical implementation, it is short-term, fast memory used to buffer data streaming between the feed input processor and the feed output processor. User systems 152 connect to respective data centers 150 to receive the information items. In the figure, elements are labeled to indicate multiple instances of like objects. For example, the data sources are labeled 120(1), 120(2), ..., 120 and the user systems are labeled 152(1), 152(2), ..., 152(M).

In a specific example, a provider of New York Stock Exchange (NYSE) transactions might stream quotes and quote updates to a collection data center operated by Yahoo!. That collection data center then processes the stream, along with others, for distribution to Yahoo! data centers around the world, through network links of varying capacity. A Yahoo! user might then direct the user's computer system (PC, laptop, wireless device, telephone, or the like) to connect to a Yahoo! data center (usually the most easily accessed or closest data center, but that is not required) to obtain current quotes.

Collection data center 110 also includes a dynamic load analyzer 142 that determines load factors for the distribution networks between collection data center 110 and data centers 150. Such load factors are considered in updating parameters in parameter database 140 that, as described in more detail below, are used to determine how the bulk data is sampled and/or processed by feed output processor 136.

Parameter database 140 maintains a number of tables containing a number of records of parameters used for processing the streams. Some of the parameters are shown in the following tables that are illustrative of the databases and/or data tables that might be used in a collection data center.

Table 1 lists parameters associated with a data center. Where a collection center receives and distributes data streams to multiple data centers, multiple instances of such data center parameter table might be present. In some implementations, the correspondence is one-to-one, whereas in others, some data centers receive distributions unrelated to parameters from parameter database 140. For example, if the connection between the collection center and the data center has enough bandwidth, all the data from all the received streams might be forwarded to that data center without needing to consult parameters in a parameter table for that data center. Some of the parameters accumulate over an "SSU" interval, which is the time between System Statistics Updates.

Table 2 (an "item" table) lists parameters associated with information items. A given information item, q, is something that can be updated, such as the current quote for ticker symbol YHOO, or the weather in Sunnyvale, Calif. Some item entries in the item table might be for single items, such as quotes for YHOO, but other item entries in the item table might be for groups of related or unrelated items that can be updated, such as the weather for 20 counties in California, a miscellaneous collection of items not having a common characteristic or some set that is only partially related. By way of example, high volume items might be treated as individual items while a group of low volume items might be grouped as one "item" in the table. It should be understood that "information item" as used herein can refer to a group of one item or a group of more than one item. In some embodiments, all items might each have their own group, in some embodiments some items have their own groups, and in others all items might be grouped into groups having more than one item therein, as items are generally considered. In the general case, zero or more groups comprise single information items and zero or more groups comprise more than one information item.

In some cases, a given information item never gets updated, such as a news article on a specific incident, but more commonly, the information item is updated. Other examples of information items is a set of objects, such as the set of current commentary articles on a particular company, the set of weather reports for different areas of a country or a set of low-traffic stock quotes. While the set might comprise individual and more or less related or unrelated items, they can be grouped together for handling at the collection data center. The information items that never get updated need not be treated as a special case, but could just be treated as items that get updated only after some arbitrarily long period has passed.

Parameter database 140 might also maintain tables associated with streams (data sources), such as Table 3. Where a collection center receives and distributes data streams to multiple streams, multiple instances of such a stream parameter table might be present. In some implementations, the correspondence is one-to-one, whereas in others, some streams are received by the collection center but are not processed using parameters from parameter database 140. For example, the volume of data from a weather data source is often so many degrees of magnitude less than the volume from a financial data source that all received weather data might be passed through the collection center without processing and not significantly affect congestion to the data centers. In some situations, with more than one large data source, some balancing can be done among data sources.

Parameter database 140 might be arranged as a conventional database, but with high responsiveness. Typically, parameter database 140 maintains one item table per item per data center. If one or more data stream is divided into many information items, q, then the number of item tables might be quite large. However, if the database is efficiently indexed, such as through the use of hashing, millions of item tables might be accommodated. In some implementations, parameter database 140 is largely or entirely stored in fast memory so it can be accessed quickly. Parameter database 140 could be updated in real-time, by dynamic load analyzer 142 or other process, allowing for real-time adjustment of sampling rates to cope with dynamic environments, such as networks with varying capacity or other effects on throughput.

TABLE 1

Per Data Center Parameters

| Parameter | Units | Description |
|---|---|---|
| $T_0$ | seconds | Time of Initial Start |
| $T$ | seconds | Current Time |
| $T_u$ | seconds | Time of Last System Statistics Update (SSU) |
| $I_u$ | seconds | SSU interval |
| $I_s$ | seconds | Sweeping Phase Interval |
| $I_p$ | seconds | Time interval to initialize system statistics if required |
| $I_m$ | seconds | Maximum non-active period used in sweep phase |
| $N_{su}$ | bytes | Data Distributed in All Prior Intervals $[T_0, T_u]$ |
| $N_s$ | bytes | Data Put in Distribution Queue in Current Interval $[T_u, T]$ |
| $N_{du}$ | bytes | Data Remaining in Distribution Queue at $T_u$ |
| $N_d$ | bytes | Data Remaining in Distribution Queue at $T$ |
| $U_a$ | bytes/sec | Update Rate, calculated from $U_a = N_a/(T - T_u)$ over all sources (Total Update Rate) |
| $C$ | bytes/sec | Network Capacity Calculated for Current SSU Interval as $C = (N_s + N_{du} - N_d)/(T - T_u)$ |
| $C_p$ | bytes/sec | Network Capacity from Previous SSU Interval |

TABLE 2

Per Information Item/Group Parameters

| Parameter | Units | Description |
|---|---|---|
| $t_q$ | seconds | Time Last Sample Placed on Distribution Queue |
| $n_{qa}$ | bytes | Update Data Received in All Prior Intervals $[T_0, T]$ |
| $n_q$ | bytes | Update Data Received in Current Interval $[T_u, T]$ |
| $U_q$ | bytes/sec | Update Rate, calculated as $U_q = n_q/(T - T_u)$ |
| $s_{qa}$ | bytes | Sample Data Put on Distribution Queue in All Intervals $[T_0, T]$ |
| $s_q$ | bytes | Sample Data Put on Distribution Queue from $T_u$ to $T$ |
| $r_q$ | bytes/sec | Sampling Rate, calculated as $r_q = S_q/(T - T_u)$ |
| $K_{qmin}$ | bytes/sec | Minimum Sampling Rate |
| $K_{qmax}$ | bytes/sec | Maximum Sampling Rate |
| $f_q$ | boolean | Distribution Queue Indicator |

TABLE 3

Per Data Source Parameters

| Parameter | Units | Description |
|---|---|---|
| $N_u$ | bytes | Data Received from Sources in All Prior Intervals $[T_0, T_u]$ |
| $N_a$ | bytes | Data Received from Sources in Current Interval $[T_u, T]$ |

The Initial Start Time may be reset each time the process resets. The Minimum Sampling Rate, $K_{qmin}$, for a given information item q represents the importance of q. An initial value for $K_{qmin}$ can, for example, be obtained from a configuration file and need not be fixed, but might be updated each SSU phase (described below) as follows:

$$K_{qmin}(\text{new}) = K_{qmin}(\text{old}) * C/C_p, \text{ if } C_p \diamond 0$$

$$K_{qmin}(\text{new}) = K_{qmin}(\text{old}), \text{ if } C_p = 0$$

where the information item's update rate, $U_q$, is less than its $K_{qmin}$ value, the sampling does not need to be at least $K_{qmin}$, but can be set to the lower update rate. The Maximum Sampling Rate, $K_{qmax}$, for a given item q and a given data center is calculated as:

$$K_{qmax} = U_q, \text{ if } U_a = 0$$

$$K_{qmax} = U_q/U_a * C, \text{ if } U_a \diamond 0$$

The Distribution Queue Indicator, $f_q$, indicates whether or not a received data update will be put on the distribution queue. If the received update is not put on the queue, $f_q$ will be set. If a data update is put on the queue, $f_q$ will be cleared.

It should be understood that while certain units are used in these tables for time (seconds), data quantity (bytes) and data rates (bytes/second), other units can be used without departing from the scope of the invention.

It should be also understood that the term "sampling rate" is not limited to some fixed data transmission rate determined based on calculations, but more generally refers to the rate of transmission that might exist if the sampling processes described herein are applied to a data stream. It is entirely possible that the numerical value of the sampling rate, or other rates, is not known until all the inputs to the sampling process are known, such as the dynamically determined values. In the most general case, the sampling rate might not be an independent variable that would be set or adjusted, by might be dependent and determined by the outcome of setting other variables and applying the sampling process to the data being sampled. Nonetheless, whether the sampling rate is determined by the setting of a "sampling rate" variable or as a byproduct of the sampling process, the data can be said to have a sampling rate.

Figure 2:
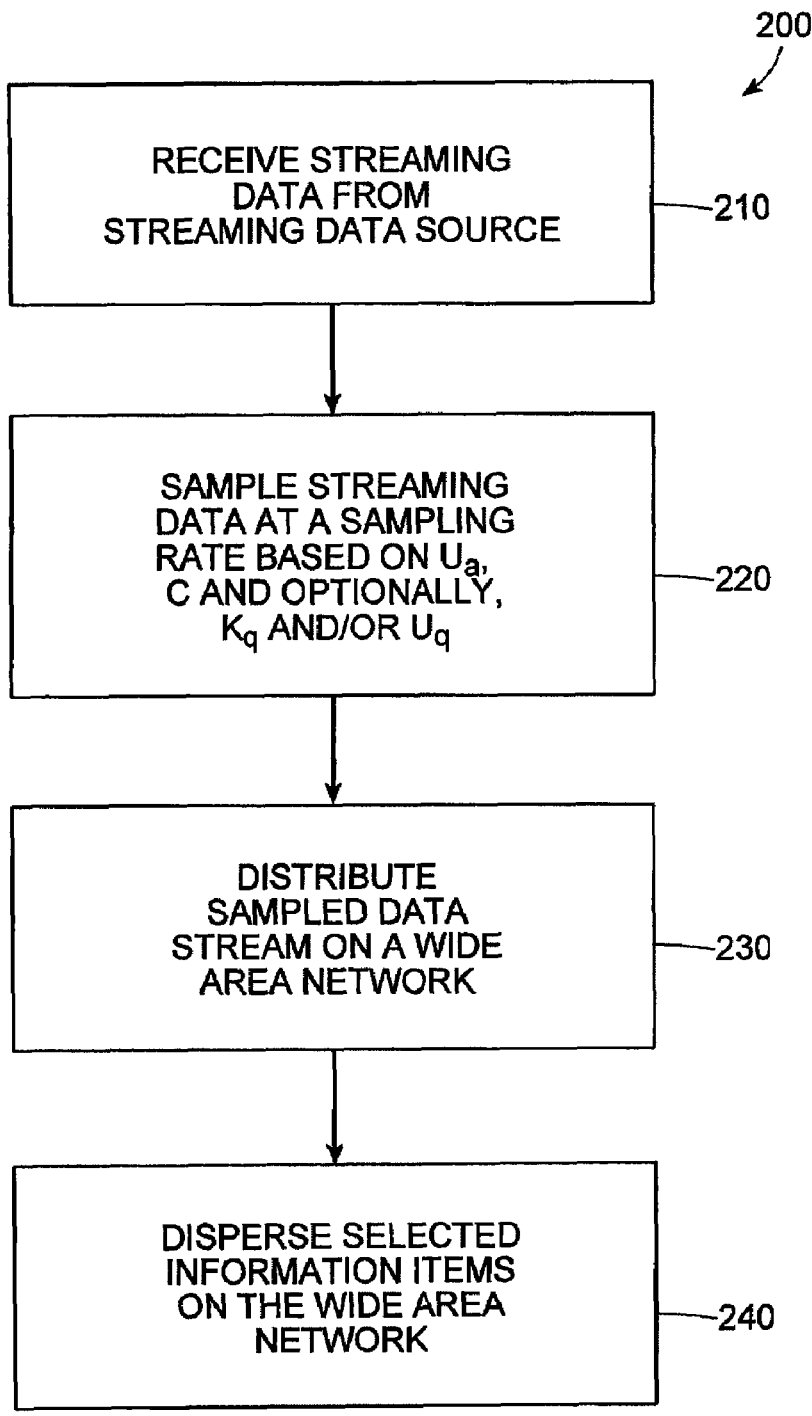
FIG. 2 is a flow diagram illustrating a sequence of steps in a process according to one exemplary embodiment of the present invention.

FIG. 2 is a flow diagram illustrating a sequence of steps in a process 200 for sampling streaming data, which includes periodically updated information items, for distribution over a wide area network (e.g., the Internet) in accordance with one embodiment of the present invention. The periodically updated information items of the streaming data can be any type of information items including, but not limited to, stock or other financial quotes, news items (e.g., sports scores or financial news items), business or financial information, weather information or other types of periodically updated information items such as air traffic tracking information items or global positioning system (GPS) information items. In addition, the periodic update rate of each of the periodically updated information items can be different from or identical to the periodic update rate of other information item(s) of the streaming data. As described above, information items might be grouped and the groups treated as described herein for items.

The network can be any type of suitable network including a public network, a private network, the Internet (i.e., a global internetwork or networks), an Intranet, an Extranet, a virtual private network (VPN), a non-TCP/IP network or a wireless network. One skilled in the art will recognize that the capacity of such networks can be limited in comparison to the streaming data. For example, the streaming data may be provided at a rate of 1 megabytes/second (MBs), while the capacity of the network may be only 20–50 kilobytes per second (KBs). In this respect, the limited capacity of the network requires that the streaming data be distributed in a rate-limited manner.

The streaming data is received from a streaming data source, as set forth in step 210. The streaming data source can be a stock exchange, business, or financial information streaming data source, and the periodically updated information items can be financial quotes (e.g., index quotes or individual stock quotes).

Subsequently, the periodically updated information items of the streaming data are sampled at a sampling rate that is based on a total update rate ($U_a$) of the streaming data and a capacity (C) of the network, as set forth in step 220. In other words, the sampling rate is calculated as a function of $U_a$ and C. The sampling of the periodically updated information items of the streaming data creates a sampled data stream that is essentially a subset of the received streaming data. In a changing environment, $U_a$ and C can be dynamically determined at a rate of, for example, at least every one or two minutes using conventional methods known to one skilled in the art. In that circumstance, since the sampling rate is based on a dynamically determined $U_a$ and C, the sampling rate itself is being dynamically adjusted in response to changes in $U_a$ and C.

In a specific example, worldwide financial quote data is collected from over fifty stock exchanges around the world and distributed from a collection center (such as Yahoo!'s California data center) to a plurality of data centers (such as Yahoo!'s data centers around the world). In this example, the typical value of $U_a$ would range from a few KBs to over 1 MBs at peak time times. The bandwidth from the collection center in California to a data center on the East Coast of the U.S. might range from 100 KBs to 400 KBs, while the bandwidth from the collection center to data centers in India or China might typically range from 10 KBs to 80 KBs. Sampling rates for each data center would be dynamically adjusted to match the network bandwidth from the collection center to those data centers.

The relevancy of the sampled data stream can be increased by sampling the periodically updated information items of the streaming data based on a factor ($K_{qmin}$) that represents the "importance" of each of the periodically updated information items and/or the individual update rate ($U_q$) of each periodically updated information item. A $K_{qmin}$ for each of the periodically updated information items can be predetermined based on prior experience (e.g., by determining which periodically updated information items have been frequently accessed or are deemed more popular by which users using which data centers). As an example, where the periodically updated information items for U.S.-based data centers are financial quotes, the $K_{qmin}$ for frequently accessed NYSE quotes can be greater than the $K_{qmin}$ for infrequently accessed quotes of other countries' stock exchanges. As with other parameters described herein, $K_{qmin}$ might relate to a single information item, such as the current quote for a specific company, or to a group of items, such as the current quotes for several variations of a specific company's securities, or unrelated items, where the group of items is treated as one item at least when determining parameters such as $K_{qmin}$ to apply to a sampling process.

$K_{qmin}$ is the minimum rate at which streaming data will be sent if the update rate for that information item is at least that rate, without considering the network bandwidth. Once apprised of the current disclosure, one skilled in the art will recognize that the $K_{qmin}$ value for the periodically updated information items can depend on the data center to which the sample data stream will be distributed. For example, if the data center serves primarily users in India, Indian financial quotes may be of more importance than Chinese financial quotes. However, if the data center serves primarily users in China, Chinese financial quotes can be of greater importance than Indian financial quotes. However, financial quotes from the NYSE and NASDAQ, for example, can be of high importance regardless of the geographic region covered by the data center.

A typical user of the data center might be an individual who accesses a web site or web page from a web server that constructs the site or page from data obtained from that data center. For example, the user might be a Yahoo! user using a Web browser or other Internet client to access a My Yahoo! web page containing news, quotes and other information.

To accommodate a changing environment, the sampling rate can be based on dynamically determined $U_a$, C, $K_{qmin}$ and $U_q$ values, to allow the sampled data stream to be distributed in a timely fashion without overwhelming the network, and with a sampling rate that is dynamically adjusted to accommodate changes in the environment. Furthermore, the sampling rate can be individually adjusted for each periodically updated information item, thus accurately sampling periodically updated information items with different update rates in a representative manner.

As an example, during peak market times, $U_a$ is about 1 MBs, while the available network bandwidth, C, is about 200 KBs to the East Coast data center and 40 KBs to the India data center. For indices such as Dow Jones Industrial Average or the NASDAQ Index, the collection center receives those streams with an update rate, $U_q$, of 400 bytes/sec. The collection center might receive each individual stock quote with an update rate, $U_q$, of 100 to 400 bytes/sec per stock symbol (such as IBM or YHOO), while less commonly traded stocks might have update rates of only a few bytes per second.

For the East Coast data center, $K_{qmin}$ might be 200 bytes/sec for NYSE, NASDAQ indices (i.e., sending, on average, every other sample received), $K_{qmin}$ might be from 40 to 100 bytes/sec for some individual NYSE, NASDAQ or AMEX stock quotes (such as IBM or YHOO) and $K_{qmin}$ might be 10 to 40 bytes/sec for all other stock quotes. For some infrequently changing ticker symbols, the sample rate might be lower that $K_{qmin}$ when the ticker symbol's update rate is less than $K_{qmin}$.

For the India data center, $K_{qmin}$ might also be 200 bytes/sec for NYSE, NASDAQ indices, but $K_{qmin}$ might be from 40 to 200 bytes/sec for some Indian stock quotes received at the collection center with an update rate of 40 to 400 bytes/sec.

The sampled data stream is distributed on the network, as set forth in step 230. The distribution of the sampled data stream can be accomplished using conventional methods such as TCP/IP transport.

Depending on $U_a$, C, and, optionally $K_{qmin}$ and/or $U_q$, periodically updated information items that are rarely updated may be sampled for distribution on the network at a rate that could be considered insufficient. In that circumstance, such rarely updated information items can be selected for dispersion on the network, as set forth in step 240. This dispersion of selected periodically updated information items (e.g., information items that are rarely updated) is referred to as a "SWEEP" step (or phase) below.

Figure 3:
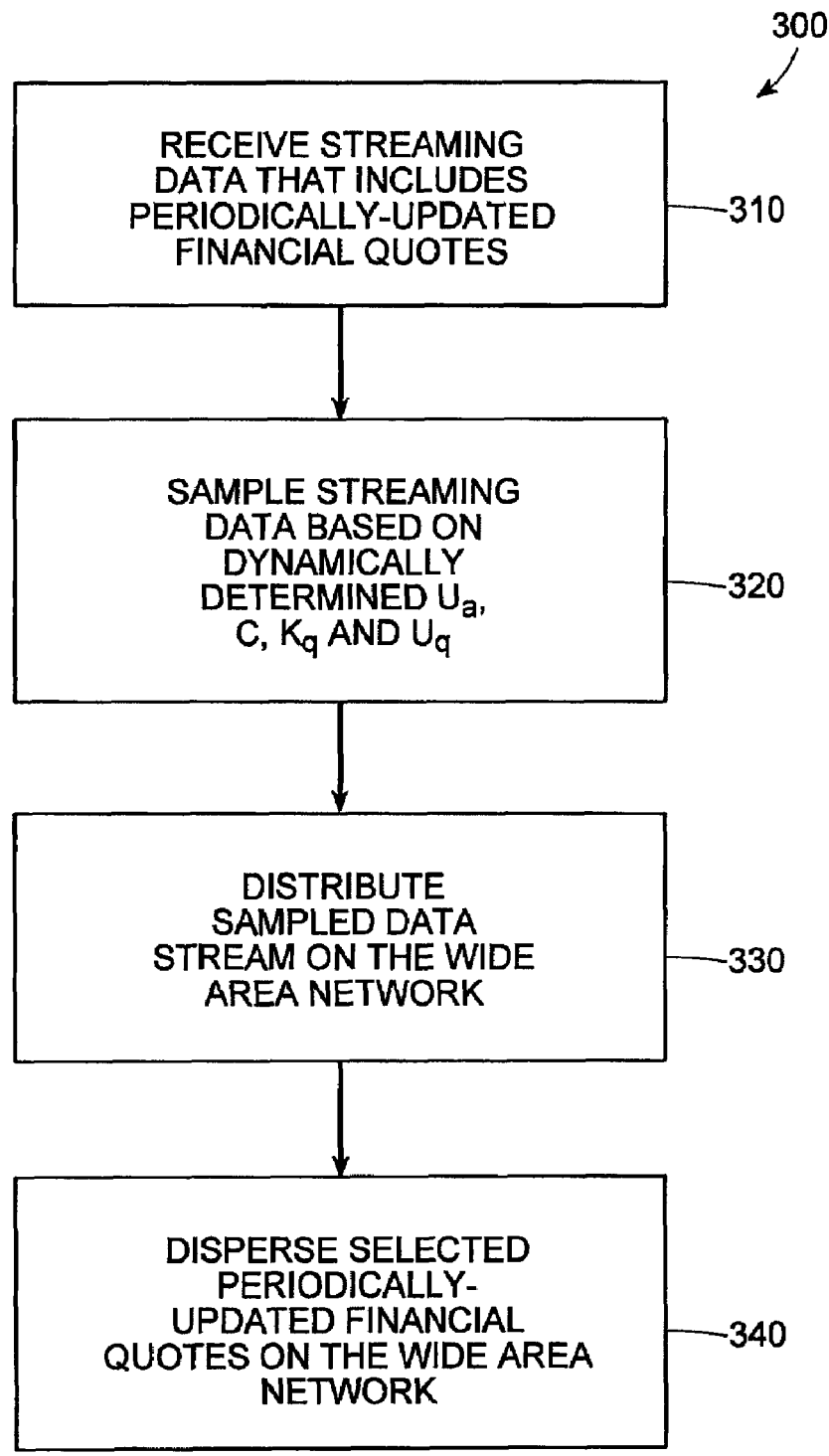
FIG. 3 is a flow diagram illustrating a sequence of steps in a process according to another exemplary embodiment of the present invention.

FIG. 3 is a flow diagram illustrating a sequence of steps in a process 300 for sampling streaming data, which include periodically updated financial quotes, for distribution over the Internet in accordance with the present invention. Process 300 includes receiving the streaming data from a streaming data source, as set forth in step 310.

Subsequently, as set forth in step 320, each of the periodically updated financial quotes of the streaming data is sampled using a sampling rate based on a dynamically determined total update rate of the streaming data ($U_a$), a dynamically determined capacity of the network (C), a predetermined importance ($K_{qmin}$) of each of the periodically updated information items and a dynamically determined update rate ($U_q$) of each of the periodically updated information items.

The sampling of the periodically updated financial quotes creates a sampled data stream, as set forth in step 320. The sampled data stream is then distributed on the Internet, as set forth in step 330. In process 300, selected periodically updated financial quotes (e.g., financial quotes that have been rarely-updated in the streaming data) are also dispersed on the network (see step 340).

FIG. 4 is a flow diagram illustrating various phases of a process to accomplish the sampling, distribution and dispersing steps described above. As shown there, the process begins with an initialization phase (phase 1), typically triggered by a server being initialized or other reason for starting the process. The time of starting this process (or just when this phase is complete) is referred to herein as the "method starting time". In phase 1, the in-memory database is initialized, necessary system and quote statistics are calculated, and a start timer for an SSU phase and SWEEP phase (each of which is described in detail below) are initiated as follows. In particular, the in-memory database and $T_0$ are initialized and values for $I_u$, $I_s$, $I_p$, $I_m$ and $K_{qmin}$ are obtained from a configuration file.

The values for $T_u$, $N_u$, $N_a$, $U_a$, $N_{su}$, $N_{du}$, $N_s$, $N_d$, C, $C_p$, $t_0$, $n_{qa}$, $n_q$, $U_q$, $s_{qa}$, $s_q$, $r_q$, $K_{qmax}$ and $f_q$ can be obtained from a configuration file. Alternatively, the process can include an additional phase (phase 1A), wherein all received streaming data is placed in the distribution queue without sampling for a time period of $I_p$ and that process is monitored to determine suitable values for those variables that are not obtained from the configuration file.

Also in phase 1, an SSU phase timer and a sweep phase timer are started (explained below). The timer intervals are $I_u$ and $I_s$, respectively. In this phase, the process includes starting the necessary threads to continuously get data from the distribution queue and send it out to the network and update system statistics $N_{su}$, $N_{du}$, $N_s$ and $N_d$ as needed.

In Phase 2, the streaming data are sampled and the sampled data stream is distributed over the network. The activity in this phase might be triggered by the receipt of periodically updated information items, such as an update to a financial quote. In this phase, the received streaming data are sampled as follows:

1. Obtain current system time T.
2. Overwrite existing data with a received periodically updated financial quote update, set $f_q$.
3. Calculate $u_s$. If $u_s <= K_{qmin}$, put the periodically updated financial quote update on the distribution queue, set $t_q=T$, clear $f_q$, and go to step 5 of Phase 2. Otherwise, continue to step 4 of Phase 2.
4. Calculate $K_{qmin}$, if $u_s <= K_{qmin}$, put the periodically updated financial quote update on the distribution queue, set $t_q=T$, clear $f_q$.
5. Update other quote statistics (i.e., $n_q$, $s_q$, $n_{qa}$, $s_{qa}$) and system variables ($N_a$, $N_s$).

Phase 3 (referred to as the "SSU phase") is triggered by expiration of the SSU timer. In this phase, several method and financial quote statistics are dynamically determined (either calculated or determined using conventional network and environment monitoring techniques) or dynamically updated as follows. Specifically, the calculated or determined quantities include C, and possibly $K_{qmin}$. The updated values include CP, $T_u$, $N_u$, $N_{su}$, $N_{du}$. Then the SSU timer is reset and the phase changes to Phase 2.

Phase 4 (referred to as the "SWEEP phase") is triggered by a sweep timer. In this phase, the in-memory database is scanned and any periodically updated financial quotes that have been updated in the streaming data but not yet distributed on the Internet during the last time duration denoted by $I_m$ will be distributed. The financial quotes and other information items that meet this criteria are referred to as "selected periodically updated financial quotes". In this phase, the current system time T is obtained, the in-memory database is scanned and periodically updated financial quotes are retrieved. Then, for each quote where $T-t_q>=I_m$ and $f_q$ is set, the financial quote is distributed and $f_q$ cleared. Then the sweep timer is reset and the phase changes to Phase 2.

Methods according to the present invention can be efficiently implemented via software and hardware, for example, a modular C/C++ programming language library on a FreeBSD operating system with an in-memory database. However, one skilled in the art will recognize that other programming languages (such as Java, Perl, Visual Basic, and Pascal) and any other operating systems (such as Windows, Solaris, and Linux) can be utilized to implement the present invention.

It should be understood that various alternatives to the embodiments of the invention described herein may be employed in practicing the invention. It is intended that the following claims define the scope of the invention and that methods within the scope of these claims and their equivalents be covered thereby.

What is claimed is:

1. A method for sampling streaming data, which includes periodically updated information items, for real-time distribution on a network, the method comprising:
   receiving the streaming data from a streaming data source;
   sampling the periodically-updated information items of the streaming data using a sampling process based at least in part on one or more update rates of the information items of the streaming data and on a capacity of the network into which the data is to be distributed, thereby creating a sampled data stream;
   distributing the sampled data stream on the network;
   determining, over a sweep interval, if any of the periodically-updated information items were updated by the streaming data but not sampled in the sampling step and distributed in the distributing step; and
   distributing on the network the information items determined in the step of determining, independent of the sampling process that would have otherwise excluded the distribution of the information item for the sweep interval.

2. The method of claim 1, wherein the one or more update rates and network capacity are dynamically determined.

3. The method of claim 1, wherein the sampling is further based on a determined importance of each of the periodically-updated information items.

4. The method of claim 3, wherein the one or more update rates comprises an update rate of each of the periodically-updated information items.

5. The method of claim 1, wherein the one or more update rates comprises a dynamically-determined update rate of each of the periodically-updated information items and a dynamically-determined total update rate of the information items in the streaming data, wherein the network capacity comprises a dynamically-determined network capacity, and wherein the sampling is further based on a determined importance of each of the periodically-updated information items.

6. The method of claim 5, wherein the dynamically-determined total update rate, the dynamically-determined network capacity and the dynamically-determined update rate of each of the periodically-updated information items are dynamically determined at least every predetermined time interval.

7. The method of claim 3 or 5, wherein the determined importance is dynamically determined at least every predetermined time interval.

8. The method of claim 7, wherein the determined importance is dynamically determined based on execution conditions.

9. The method of claim 7, wherein the determined importance is dynamically determined based on a previously-determined importance, the current network capacity, and a previous network capacity.

10. The method of claim 1, wherein the streaming data includes periodically-updated financial quote information items.

11. The method of claim 1, wherein the streaming data includes periodically-updated financial quote information items.

12. A method for sampling streaming data, which includes periodically-updated information items, for distribution on a network, the method comprising:
   receiving the streaming data from a streaming data source;
   sampling each of the periodically-updated information items of the streaming data so as to create a sampled data stream using a sampling process based on:
      a dynamically-determined total update rate of the streaming data ($U_a$);
      a dynamically-determined capacity of the network ($C$);
      a determined importance ($K_{qmin}$) of each of the periodically-updated information items; and
      a dynamically-determined update rate ($U_q$) of each of the periodically-updated information items;
   distributing the sampled data stream on the network;
   determining, over a sweep interval, if any of the periodically-updated information items were updated by the streaming data but not sampled and distributed; and
   distributing on the network the information items determined in the step of determining, independent of the sampling process that would have otherwise excluded the distribution of the information item for the sweep interval.

13. The method of claim 10, wherein the streaming data includes periodically-updated financial quote information items.

14. The method of claim 10, wherein the total update rate, the network capacity and the dynamically-determined update rate of each of the periodically-updated information items are dynamically-determined at least every predetermined time interval.

15. The method of claim 10, wherein the determined importance ($K_{qmii}$) of each of the periodically-updated information items is dynamically determined based on execution conditions.

16. The method of claim 10, wherein the determined importance ($K_{qmiti}$) of each of the periodically-updated information items is dynamically determined based on a previously-determined importance, the current network capacity, and a previous network capacity.

* * * * *